June 24, 1941.   H. WHITSETT   2,247,040
HOT OIL STRAINER
Filed June 22, 1939
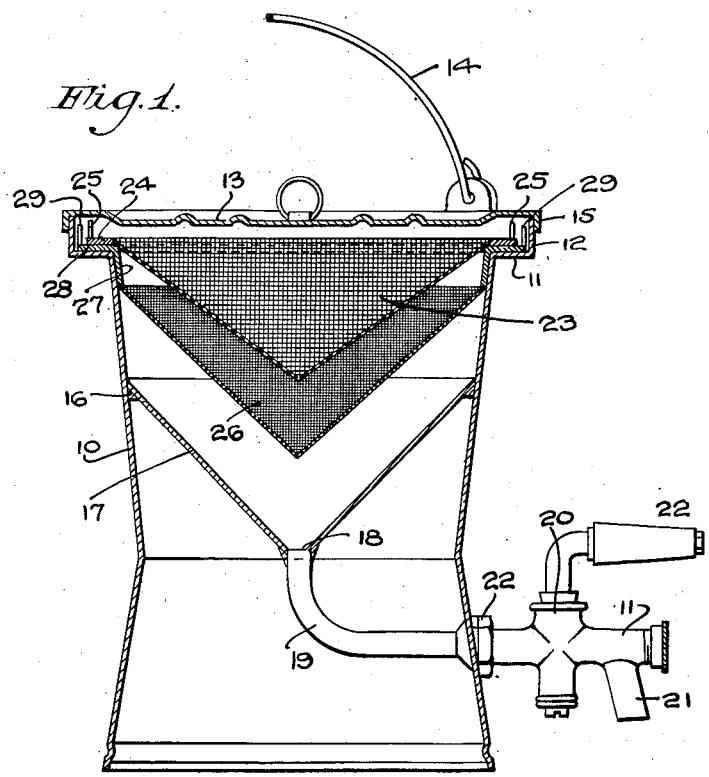
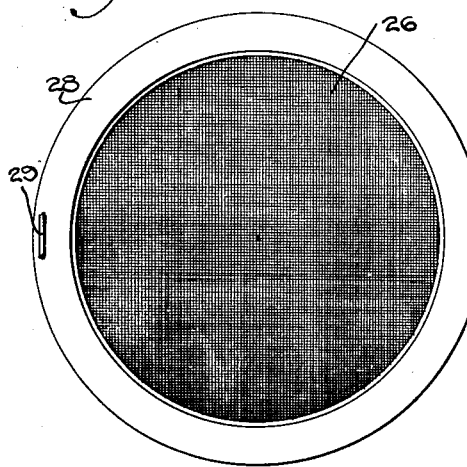
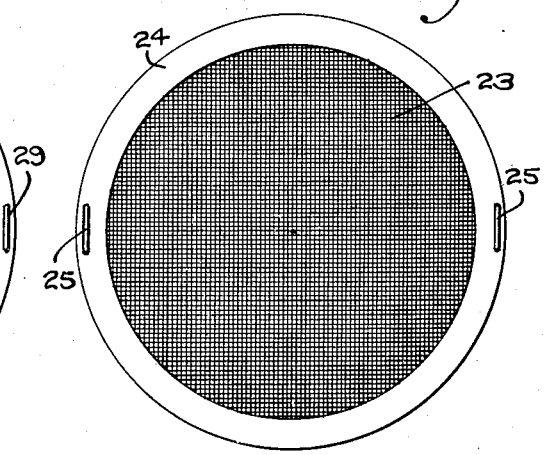
INVENTOR.
HENRY WHITSETT
BY
*Len Edelson*
ATTORNEY.

UNITED STATES PATENT OFFICE 2,247,040

HOT OIL STRAINER

Henry Whitsett, Philadelphia, Pa.

Application June 22, 1939, Serial No. 280,637

3 Claims. (Cl. 210—155)

This invention relates to hot oil strainers and has for one of its objects to provide a multiple of strainers by means of which hot oils or fats, such as are used in cooking and deep fat frying, may be thoroughly strained at a single operation to remove all foreign particles therefrom.

Another object of the invention is to provide a strainer so constructed that the several parts thereof may be readily disassembled so as to permit of them being thoroughly cleaned after the hot oil has been strained.

Still another object is to provide the strainers in combination with a storage container which is adapted to be kept on a hot stove to retain cooking oils or fats strained in liquid condition for use as desired.

Other objects and advantages of the invention will hereinafter appear and the novel features thereof will be specially defined by the appended claims.

The invention is clearly illustrated in the accompanying drawing, in which like reference characters refer to like parts and in which:

Figure 1 is a view in vertical section through the hot oil strainer;

Figure 2 is a plan view of the upper strainer; and

Figure 3 is a plan view of the lower strainer.

It is well known in the art of cooking to use a method known as deep fat frying in which the article of food to be so cooked is immersed for the required interval in a quantity of very hot fat or oil, the fat or oil being derived either from a vegetable or animal source and being usually hard at normal room temperatures. In this process of cooking, particles of food often remain in the hot fat after the article of food is removed therefrom and it is an object of this invention to provide a hot fat or oil strainer to remove such particles of food, and to store the hot oil.

Referring now more particularly to the drawing wherein is illustrated a preferred construction of the device constructed in accordance with and embodying the principles of the present invention, it will be observed that this device generally includes a main body 10 formed of a suitable material, preferably metal and of generally cylindrical form, the top and bottom ends of this main body being each open as appears most clearly in Figure 1. The upper end of the body 10 is provided with an outwardly projecting annular flange 11 which terminates in a vertically extending flange 12. A top cover or lid 13, preferably equipped with a bail type handle 14, is provided for closing the top of the body 10, this cover being provided with an annular flange 15 which snugly fits over and embraces the upstanding flange 12 of the main body.

Disposed interiorly of the body 10 and permanently secured thereto, as at 16, is a conically shaped receptacle 17 for receiving the strained oil. As appears in Figure 1, this receptacle is disposed with its reduced end projecting downwardly, the bottom extremity of the receptacle being provided with an opening 18 within which is fitted one end of an oil conduit 19 which is designed to convey the strained hot oil out of the receptacle 17 through a manually operated valve 20 to a discharge spout 21. As clearly appears in Figure 1, the conduit 19 extends downwardly from the receptacle 17 and thence laterally through a side wall of the main body 10, the conduit being rigidly secured to the side wall 10 in any suitable manner, as by the fitting 22. The conduit 19 thus serves not only to convey the strained hot oil from the receptacle 17 to the spout 21 but also serves as an element for rigidly supporting the receptacle 17 in its secured position within the main body 10.

By means of the valve 20, which is equipped with a conventional operating handle 22, the flow of the hot oil out of the receptacle 17 may be regulated as desired and by closing the valve the strained hot oil received within the receptacle may be stored therein until such time as it is needed. It is to be noted that the bottom of the main body 10 is open so that when the device is placed on top of a hot stove the interior of the main body 10 may be subjected to heat so as to maintain the oil which is stored in the receptacle 17 and within the conduit 19 in liquid condition.

Disposed within the top of the main body 10 are a pair of strainers each of generally conical form and arranged in vertically spaced relation one with respect to the other. The uppermost strainer 23 is formed of relatively coarse gauge wire screening, the upper edge of this strainer being provided with a flat annular supporting ring 24 which is provided, preferably at diametrically opposed points a pair of lifting handles 25—25. The lowermost strainer 26 is formed of relatively fine gauge metal screening and is provided at its upper edge with an upstanding annular collar 27 terminating in a radially extending flange 28, this flange serving as an annular support for the fine gauge strainer 26. As in the case of the coarse gauge strainer, the annular flange 28 is provided at diametrically opposed points with a pair of lifting handles 29—29.

As clearly appears in Figure 1, the final gauge strainer 26 is so disposed within the top of the main body 10 that the upper marginal edge of the strainer proper lies in a plane spaced below the plane of the annular flange 11 of the main body, this disposition of the strainer 26 within the body 10 being obtained by means of the annular flange 27 which fits concentrically within the top of the main body 10 and serves to suspend the strainer 26 within said main body.

The coarse gauge strainer 23 is disposed with its annular supporting ring 24 resting directly upon the flange 28 of the lowermost fine gauge strainer 26, the relative diameters of the members 24 and 28 being such as to readily permit the strainers 23 and 26 to be disposed in the nested relation shown with the former spaced vertically above the latter.

The conical shape of the strainers 23 and 26 provide for the strained particles of food accumulating at the pointed lower ends of the strainers, thus maintaining at all times an active straining surface upon which the hot oil may be poured and through which it may be strained of all foreign particles. The conical shape of the strainers of the receptacle 17 also adapt these parts to be assembled in the nested relationship shown, thereby providing for a compactness while retaining the advantage of the larger area of surface of a cone for the strainers. In other words, the conically shaped strainers provide a larger area of straining surface than would a flat strainer and permitting them to be so nested as to require a minimum of accommodating space therefor. The uppermost coarse gauge strainer 23 serves to remove the larger particles of food and the like while permitting the more minute particles to pass therethrough, whereas the lowermost fine gauge strainer 26 serves to prevent the passage into the receptacle 17 of those minute particles which may have passed through the strainer 23. By so providing this dual arrangement of strainers, the possibility of the strainers becoming readily clogged is eliminated, thus requiring removal and cleansing of the strainers at less frequent intervals while insuring more rapid straining of the oil.

It will be understood, of course, that the invention is susceptible of various changes and modifications which may be made from time to time without departing from the real spirit or general principles thereof and it is, accordingly, intended to claim the invention broadly, as well as specifically, as indicated in the appended claims.

I claim:

1. A hot oil strainer of the class described comprising an open-ended cylindrical member having along its upper edge an annular horizontal flange terminating in an upwardly extending vertical flange to provide an annular seat interiorly of said member, an oil receiving pan secured interiorly of said member intermediate the top and bottom ends thereof; said pan being of inverted conical shape having an oil discharging opening at the apex of the inverted cone, a tube connected to said opening and extending transversely through the wall of said member at a point below said pan, an oil draw-off faucet secured to the outer end of said tube, and a pair of strainers detachably supported within said member above said pan, the bodies of said strainers being each of inverted conical shape and having flat annular flanges surrounding the upper edges thereof for supporting the same upon said annular seat, said strainers being respectively of such shape and positionally so related that while the supporting flanges thereof are in flatwise engagement with each other when resting on said seat the strainer bodies are substantially separated vertically from each other and from the conical oil receiving pan.

2. A hot oil strainer as defined in claim 1 wherein said strainer bodies are formed of wire screening and wherein the guage of the uppermost strainer body is relatively coarse as compared with the guage of the lowermost strainer body.

3. A hot oil strainer as defined in claim 1 wherein said cylindrical member is provided with a removable cover for closing the upper end thereof and wherein said strainers are each provided with means for facilitating their removal from within said member.

HENRY WHITSETT.